(No Model.)
R. G. PAINE.
CALK ATTACHMENT FOR HORSESHOES.
No. 577,535. Patented Feb. 23, 1897.
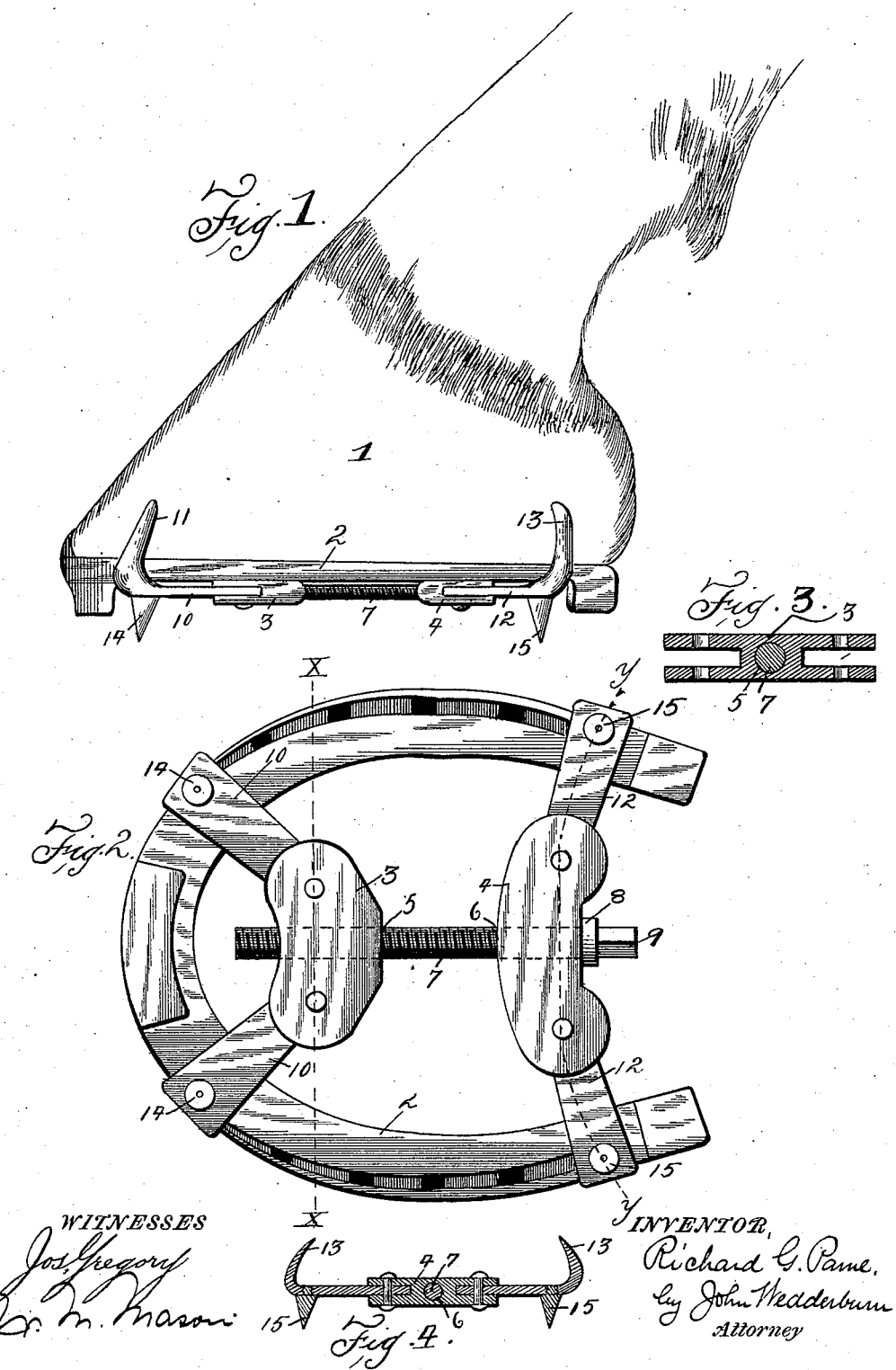

UNITED STATES PATENT OFFICE.

RICHARD G. PAINE, OF WASHINGTON, DISTRICT OF COLUMBIA.

CALK ATTACHMENT FOR HORSESHOES.

SPECIFICATION forming part of Letters Patent No. 577,535, dated February 23, 1897.

Application filed August 7, 1896. Serial No. 602,034. (No model.)

*To all whom it may concern:*

Be it known that I, RICHARD G. PAINE, a citizen of the United States, residing at Washington, District of Columbia, have invented certain new and useful Improvements in Horseshoes; and I do hereby declare the following to be a full, clear, and exact description of the invention, such as will enable others skilled in the art to which it appertains to make and use the same.

My invention relates to certain new and useful improvements in calks for horseshoes and means for attaching them to the shoe, the object of the same being to provide a device of this character which can be readily, quickly, and securely attached to the shoe and as easily and quickly removed.

The invention consists of two plates having openings formed therein, a screw-bolt passing through said openings having a rectangular extension upon its outer end for receiving a key or wrench, a pair of arms having flanges or hooks upon their outer ends pivoted to each of said plates, and calks adapted to be screwed into said arms.

The invention also consists in other details of construction and combinations of parts, which will be hereinafter more fully described and claimed.

In the drawings forming part of this specification, Figure 1 represents a side elevation illustrative of my invention. Fig. 2 is a bottom plan view of the same. Fig. 3 is a section of a plate on the line *x x* of Fig. 2, and Fig. 4 is a section of the calk attachment on the line *y y* of Fig. 2.

Like reference-numerals indicate like parts in the different views.

To the hoof 1 of the horse is attached in the usual manner a horseshoe 2 of ordinary construction. My attachment is made up of plates 3 and 4, having openings 5 and 6 therein, through which passes a threaded bolt 7 with a shoulder 8 near its outer end and a rectangular extension 9 at its extreme outer end, to which a key or wrench may be applied for turning said bolt. The hole 5 in the plate 3 is screw-threaded, while the hole 6 in the plate 4 is plain. The plate 3 when the attachment is in place is located on the under side of the shoe 2, at a point near the toe thereof, and the plate 4 is located at a point near the heel of the shoe. Pivoted to the plate 3 and fitting within sockets or recesses in said plate are arms 10 10, the same extending outwardly therefrom and having upwardly-extending hooks or flanges 11 upon their outer ends. Similar arms 12 are pivoted to the plate 4 within suitable sockets and extend outwardly from said plate, having hooks 13 upon their outer ends which extend upwardly and are adapted to embrace the heel of the shoe 2 and a portion of the hoof 1. Toe-calks 14 14 are adapted to be screwed or otherwise connected to the arms 10, and similar heel-calks 15 are adapted to be screwed or otherwise secured to the arms 12.

In applying my device the screw-bolt 7 is turned to the left, separating the plates 3 and 4 so that the hooks or flanges 11 and 13 on the arms 10 and 12 may be readily passed around the shoe 2 and the hoof 1. A wrench is then applied to the rectangular extension 9 on the bolt 7, the said bolt turned to the right, drawing the plate 3 toward the plate 4 by reason of the engagement of the shoulder 8 with the latter, and forcing said hooks or flanges in close contact with the shoe and hoof. When a sufficient tension of the parts has been reached, it is impossible for the calks to become detached from the shoe. Should the calks proper, 14 and 15, become worn down, they may be unscrewed and replaced by new ones.

To remove the attachment, a reverse operation to that just described should be performed.

From the foregoing description it will be seen that I have provided a calk attachment for horseshoes which is extremely simple in construction, can be cheaply made, is strong and durable, and can be readily applied and detached in the shortest possible time.

Having now described my invention, what I claim as new, and desire to secure by Letters Patent, is—

1. The herein-described calk attachment for horseshoes, consisting of a pair of plates, one having a threaded opening therein and the other a smooth opening, a threaded bolt passing through said plates whose threaded portion is adapted to engage said threaded opening, and which is provided with a head or shoulder upon one end adapted to engage the plate having a smooth opening, arms pivotally connected to said plates and extending outwardly therefrom, hooks or flanges upon said arms, and calks screwed or otherwise connected to the under side of said arms.

2. The herein-described calk attachment for horseshoes, consisting of plates having holes formed therein, one of said holes having screw-threads formed in it, and the other having a smooth opening through it, a threaded bolt passing through the openings in said plates and having a shoulder upon its outer end which engages one of said plates, a pair of arms pivoted to each of said plates and extending outwardly therefrom, upwardly-extending hooks on said arms, and calks screwed or otherwise connected to the under side thereof, substantially as and for the purpose described.

In testimony whereof I have signed this specification in the presence of two subscribing witnesses.

RICHARD G. PAINE.

Witnesses:
B. M. BRODIE,
A. J. GUNNING.